United States Patent
Bruder et al.

(10) Patent No.: US 8,778,476 B2
(45) Date of Patent: Jul. 15, 2014

(54) HIGH SPEED DVDS

(75) Inventors: Friedrich-Karl Bruder, Krefeld (DE); Wilfried Haese, Odenthal (DE); Rafael Oser, Krefeld (DE); Wolfgang Fischer, Meerbusch (DE); Michael Ludewig, Odenthal (DE); Raymond Wong, Hong Kong (CN); Ice Zhang, Shanghai (CN)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 13/575,780

(22) PCT Filed: Jan. 26, 2011

(86) PCT No.: PCT/EP2011/051063
§ 371 (c)(1),
(2), (4) Date: Oct. 19, 2012

(87) PCT Pub. No.: WO2011/092200
PCT Pub. Date: Aug. 4, 2011

(65) Prior Publication Data
US 2013/0029081 A1    Jan. 31, 2013

(30) Foreign Application Priority Data
Jan. 28, 2010 (WO) ................ PCT/CN2010/000124

(51) Int. Cl.
*G11B 7/24* (2013.01)
*G11B 7/2533* (2013.01)
*G11B 7/253* (2013.01)
*G11B 7/24047* (2013.01)

(52) U.S. Cl.
CPC .............. *G11B 7/2533* (2013.01); *G11B 7/253* (2013.01); *G11B 7/24047* (2013.01)
USPC ..................... 428/64.1; 428/64.4; 430/270.11

(58) Field of Classification Search
CPC ... G11B 7/253; G11B 7/2533; G11B 7/24047
USPC ........................................................ 428/64.1
See application file for complete search history.

(56) References Cited

U.S. PATENT DOCUMENTS

| | | | |
|---|---|---|---|
| 5,097,002 A | 3/1992 | Sakashita et al. | |
| 5,340,905 A | 8/1994 | Kuhling et al. | |
| 5,717,057 A | 2/1998 | Sakashita et al. | |
| 6,100,326 A | 8/2000 | Richter et al. | |
| 6,335,382 B1 | 1/2002 | Iida | |
| 6,596,840 B1 | 7/2003 | Kratschmer et al. | |
| 2004/0158026 A1 | 8/2004 | Kauth et al. | |
| 2010/0067347 A1* | 3/2010 | Ito et al. ........................ | 369/100 |

FOREIGN PATENT DOCUMENTS

| | | |
|---|---|---|
| CN | 1456621 A | 11/2003 |
| EP | 0928788 A1 | 7/1999 |
| EP | 1158024 A1 | 11/2001 |
| EP | 1650241 A2 | 4/2006 |
| EP | 1671995 A1 | 6/2006 |
| WO | WO-00/48172 A2 | 8/2000 |
| WO | WO-00/75253 A1 | 12/2000 |
| WO | WO-01/05866 A1 | 1/2001 |
| WO | WO-2004/063249 A1 | 7/2004 |
| WO | WO-2006/046864 A1 | 5/2006 |
| WO | WO-2008/125199 A1 | 10/2008 |

OTHER PUBLICATIONS

International Search Report for PCT/EP2011/051063 mailed Apr. 14, 2011.

\* cited by examiner

*Primary Examiner* — Elizabeth Mulvaney
(74) *Attorney, Agent, or Firm* — Drinker Biddle & Reath LLP

(57) ABSTRACT

This invention relates to DVDs made from polycarbonate and a special UV curable bonder material consisting of A) an urethane acrylate oligomer as binder, which is the reaction product of i) one or more polyisocyanates and ii) one or more hydroxyfunctional lactone ester (meth)acrylates having a number average molecular weight of from 200 g/mol to 2000 g/mol and having the formula: $CH_2=C(R^1)-C(O)-O-R^2-[O-C(O)-R^3]_n-OH$ wherein, n is an integer from 1 to 5, $R^1$ is hydrogen or methyl, $R^2$ represents an alkylene group or substituted alkylene group having from 2 to 10 carbon atoms and $R^3$ represents a straight or branched chain alkylene group of from 3 to 8 carbon atoms, and which may be substituted with one or more alkyl groups having from 1 to 12 carbon atoms, B) a reactive thinner, comprising of mono functional acrylates and/or (meth)acrylates C) a photo initiator and D) optional additives which offers improved performance at high data transfer rates.

11 Claims, 1 Drawing Sheet

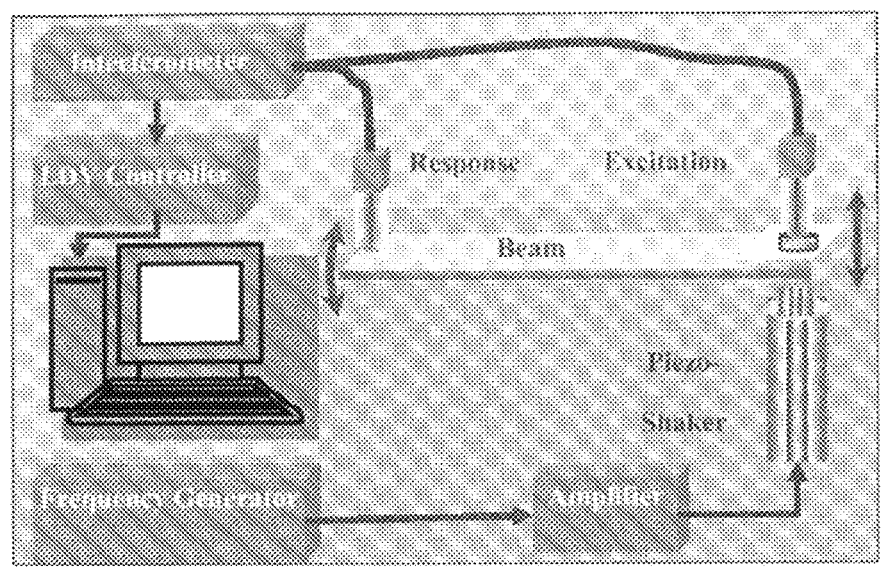
Setup of the Laser-Doppler-Vibrometer Method

HIGH SPEED DVDS

RELATED APPLICATIONS

This application is a national stage application (under 35 U.S.C. §371) of PCT/EP2011/051063, filed Jan. 26, 2011, which claims benefit of Chinese Patent Application No. PCT/CN2010/000124, filed Jan. 28, 2010.

The present invention describes the usage of special UV bonders for the production of DVDs (digital versatile discs), which facilitate improved focusing and tracking performance at high data transfer rates.

The development of optical data storage is mainly characterized by the increase of the storage capacity per disc from one generation to the next generation. This can be examplified e.g. by the 0.7 GByte capacity per disc in the Compact Disc (CD) format, the 4.7 GByte capacity of a single layer Digital Versatile Disc (DVD) and the 25 GByte capacity of a single layer Blu-ray Disc (BD). As can be seen in the case of DVD and BD those capacities can be increased by introducing e.g. double layer discs or discs with even more layers or double side accessible discs.

An additional important point is the data transfer rate during readout and/or recording of a disc. Due to the fact that the data are readout and/or recorded sequentially, the increase of the storage density lead to increasing readout and/or recording times of a full disc, despite the fact that the pits or recorded marks become smaller from one generation to the next generation. This lack of transfer rate is compensated for that the reference speed for 1× recording and readout for each format increases from one generation to the next generation. To increase the data transfer rate within a format the increase of the spinning speed of the disc facilitates high speed recording and readout.

For the CD-format drives and discs were developed which can reach 52× of data transfer rates in comparison to the 1× reference speed. For 52× speed the spinning speed is about 10500 rounds per minute (RPM) as for a 0.7 GByte capacity disc the linear reference speed is 1.2 m/s.

For the DVD-format drives and discs were developed which can access up to 22× of data transfer rate in comparison to the 1× reference speed. For 22× speed the spinning speed is about 12830 RPM. High rotation speeds will reduce recording times dramatically as can be seen from the following table 1.

TABLE 1

Writing speeds for DVD with 1X, that is 1350 kBytes/s, in the first drives and media models. More recent models work at 18X or 20X that means at 18 or 20 times higher maximum data transfer rate. Note that for CD drives, 1X means 150 kBytes/s, which is approximately 9 times slower than 1X DVD.
DVD drive speeds

| Drive speed | Max. data transfer rate (Mbit/s) | (MB/s) | ~Write time (min) Single Layer | Double Layer |
|---|---|---|---|---|
| 1X | 10.55 | 1.35 | 61 | 107 |
| 2X | 21.09 | 2.70 | 30 | 54 |
| 2.4X | 27.43 | 3.51 | 24 | 42 |
| 4X | 42.19 | 5.40 | 15 | 27 |
| 6X | 63.30 | 8.10 | 11 | 18 |
| 8X | 84.38 | 10.80 | 8 | 14 |
| 12X | 126.60 | 16.20 | 6 | 11 |
| 16X | 168.75 | 21.60 | 4 | 7 |
| 18X | 189.90 | 24.30 | 3 | 5 |
| 20X | 211.00 | 27.00 | 3 | 4 |

For the BD-format discs and drives exist that support up to 8× of data transfer rate in comparison to the 1× reference speed. For 8× speed the spinning speed is about 6480 RPM as the linear velocity for the 1× reference speed is 4.92 m/s for a 25 GByte/layer capacity disc. In the laboratory 12× recording speed was already demonstrated, which corresponds to 9720 RPM spinning speed of the disc (In proceedings of the ISOM 2006 (International Symposium of Optical Memory) held in Takamatsu, Japan, "Up to 12×BD-R (Cu:Si) Recording", R. G. J. A. Hesen, J. H. G. Jaegers, A. P. G. E. Janssen, J. Rijpers, P. R. V. Sonneville, J. J. H. B. Schleipen, Philips Research Laboratories, High Tech Campus 34, 5656 AE Eindhoven, The Netherlands).

At such high rotation speeds tracking and focusing of the laser becomes crucial to record and read data in high quality. In such cases it can happen that the disc reader or writer reduces the disc rotation speed to gain better data signal quality at lower error rates. Thus high rotation speeds cannot be achieved.

E.g. DVD writer producer often check the quality of the tracking error (TE) and focusing error (FE) signals at high speeds (e.g. 16×) before doing power calibration for recording. If TE or FE are above the writer specific limits recording will be done at a much lower speed. Examples for freeware tools to check such TE and FE quality are Plextools for Plextor writers and Qscan that works for most BenQ and Philips writers.

Proper tracking and focusing is strongly related to the evenness of the disc surface as for the optical pickup system the working distance and the alignment of its optical axis to the data tracks changes with time if the disc rotates underneath. That means that low tangential deviation of the disc is important, which means a periodic and synchronized change of the above mentioned properties for the pick up head. High requirements on low tangential and radial deviation narrow the processing window for high speed capable DVD production and means extra burden for the disc producer.

But also modal oscillations can gain significant amplitudes with respect to the focal length at high rotation speeds. Such modal oscillations also generate non synchronized transient changes of working distance and alignment which will make tracking and focusing difficult at high rotation speeds, as the tracking and focusing servos are bandwidth limited and can not follow large and highly frequent distortions fast enough. The modal oscillation is characterized by its modal frequency $f_n$ which is related to the geometry of the disc and the ration of Youngs modulus E and mass density $\rho$ according to $f_n$ proportional to $(E/\rho)^{0.5}$ (see also (3)). The quality factor Q (see formula (4)) is related to tan $\delta$ via Q=3/tan $\delta$. In that sense Q can be used as a measure of the damping like tan $\delta$. Low Q means high damping as tan $\delta$ is high. In general E and Q show a distinct dependency on frequency f. The group of lowest frequency modal oscillations of a 12 cm diameter and 1.2 mm thick disc made from polycarbonate lay in the range of 130 Hz to 170 Hz [S. Subramanian, R. Hariharan, B. Landa, T. P. Feist, in Optical Data Storage 2000, Proceedings of SPIE Vol. 4090 (2000), pp 323 ff, WO 0048172A2 Comparative example 1]. The next group modal oscillations occur around 280 Hz. As the spinning speed at 16× is about 155 Hz such modal oscillations can be easily excited during disc operation.

WO 0048172A2 discloses solutions to suppress the influence of modal oscillations on high density data storage (>5 Gbit/in2 areal density>DVD density) media by controlling stiffness and damping. However due to the fact that the information layer is at a first surface of that media the stiffness and damping requirements could be fulfilled by nontransparent substrate materials. The disclosed solutions employ sandwich injection molding processes that can not be used in economic DVD production.

EP 1 158 024 A1 describes a vibration-damping thermoplastic resin composition comprising a) 50-90 wt.-% of an amorphous thermoplastic resin having a loss tan δ of 0.01 to 0.04 and a deflection temperature under load of not lower than 120° C. and b) 50 to 10 wt. % of a methyl methacrylate resin wherein the article molded therefrom has certain physical properties. The disclosed solution achieves an increased damping and uses however polymer blends of special polycarbonates with methyl methacrylate. Optical clarity of the disclosed solutions will not be good enough for DVD applications.

WO 2006046864A1 discloses the use of urethane acrylates obtained from diols, diisocyantes and hydroxylgroup containing (meth)acrylates in combination with epoxydiacrylate, monofunctional and difunctional acrylic acid esters as adhesive for optical discs. However difunctional acrylic acid esters as well as epoxyacrylates proved to be not suitable in bonders for DVD discs at high spinning speeds (see comparative example 16).

CN 1456621A discloses a UV-curable coating suitable for DVDs. These UV-curable coatings comprising an aminoformate-acrylate ester as active oligomer, mono- and difunctional (meth)acrylates, a photoinitiator and optional additives.

There still exists the necessity for DVD discs that can provide at high spinning speeds improved tracking and focusing operation. The usage of standard DVD bonder material already impose tight production margins to keep the TE and FE signals within acceptable limits at high recording speeds. Often discs are not accepted by the DVD writers for 16× or even higher X recording because of poor tracking or focusing behavior.

It was therefore the task to provide DVDs that show wider margin with respect to tracking and focusing at high rotation speeds.

Surprisingly it was found that the usage of a special UV curable bonder can solve the above described problem. The present invention is directed to DVDs made from polycarbonate, with a special bonder material and optionally additional layers.

The UV curable bonder material is in general a spin coatable formulation consisting of
A) an urethane acrylate oligomer as binder, which is the reaction product of
  i) one or more polyisocyanates and
  ii) one or more hydroxyfunctional lactone ester acrylates having a number average molecular weight of from 200 g/mol to 2000 g/mol and having the formula:

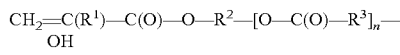

wherein n is an integer from 1 to 5, $R^1$ is hydrogen or methyl, $R^2$ represents an alkylene group or substituted alkylene group having from 2 to 10 carbon atoms and $R^3$ represents a straight or branched chain alkylene group of from 3 to 8 carbon atoms, and which may be substituted with one or more alkyl groups having from 1 to 12 carbon atoms.
B) a reactive thinner, comprising monofunctional (meth) acrylates,
C) a photoinitiator and
D) optional additives.

Additionally it was found that such special UV curable bonder when used in DVD production results in discs with a Q factor of less than 130 measured at a frequency of 270 Hz.

In a short term DVD discs made with bonders that enable an improved damping at frequency levels of around 200 Hz to 300 Hz at room temperature, provide significantly improved tracking and focusing behavior at recording speed of 16× or above.

In the context of this specification, "(meth)acrylate" relates to corresponding acrylate or (meth)acrylate functions or to a mixture of the two.

The urethane acrylate oligomer A) may be produced according to the methods described in EP-A 1 650 241 or EP-A 1 671 995.

The polyisocyanate component (i) in the urethane acrylate oligomer A) comprises
  polyisocyanates selected from the group comprising aromatic, araliphatic, aliphatic or cycloaliphatic polyisocyanates or mixtures of such polyisocyanates, for example 1,3-cyclohexane diisocyanate, 1-methyl-2,4-diisocyanato-cyclohexane, 1-methyl-2,6-diisocyanato-cyclohexane, tetramethylene diisocyanate, 4,4'-diisocyanato-diphenylmethane, 2,4'-diisocyanatodiphenylmethane, 2,4-diisocyanatotoluene, 2,6-diisocyanatotoluene, α,α,α',α,'-tetra-methyl-m- or -p-xylylene diisocyanate, 1,6-hexamethylene diisocyanate, 1-isocyanato-3,3,5-trimethyl-5-isocyanatomethylcyclohexane (is ophorone diisocyanate or IPDI), 4,4'-diisocyanato-dicyclohexyl-methane, 4-isocyanatomethyl-1,8-octane diisocyanate (triisocyanatononane, TIN) (EP-A 928 799) and mixtures thereof. Also suitable are homologues or oligomers of the mentioned polyisocyanates with biuret, carbodiimide, isocyanurate, allophanate, iminooxadiazinedione and/or uretdione groups, mixtures thereof with one another and mixtures with the polyisocyanates mentioned above. Preference is given to 1,6-hexamethylene diisocyanate, 1-isocyanato-3,3,5-trimethyl-5-isocyanatomethylcyclohexane (isophorone diisocyanate or IPDI) and 4,4'-diisocyanato-dicyclohexylmethane and mixtures thereof with one another. Preference is given also to homologues or oligomers of 1-isocyanato-3,3,5-trimethyl-5-isocyanatomethylcyclohexane (isophorone diisocyanate or IPDI) and 4,4'-diisocyanato-dicyclohexylmethane with biuret, carbodiimide, isocyanurate, allophanate, iminooxadiazinedione and/or uretdione groups, mixtures thereof with one another and mixtures with the preferred poly-isocyanates mentioned above.
  Prepolymers of hexamethylene diisocyanate, made from polyesterdiols and/or polyetherdiols and hexamethylene diisocyanate
  Prepolymers of dicyclohexylmethane diisocyanates, made from polyesterdiols and/or polyetherdiols and dicyclohexylmethane diisocyanate
  Particularly preferred as polyiisocyanate component i) are oligomers of hexamethylenediisocynate and/or dicyclohexylmethanediisocyante.

Most preferred as the hydroxyfunctional lactone ester acrylate ii) in the urethane acrylate oligomer A) is the reaction product from hydroxyethylacrylate, hydroxypropylacrylate or hydroxybutylacrylate with ε-Caprolactone.

The reactive thinner B) comprises monofunctional (meth) acrylates.

Preferred compounds B) are selected from the group comprising alkoxylated alkyl (meth)acrylates, monofunctional esters of (meth)acrylic acid and C1 to C10-alkoxylated phenoles, alkyl (meth)acrylates, cycloaliphatic (meth)acrylates and heterocyclic (meth)acrylates.

Particularly preferred compounds B) comprises compounds selected from the group of C1- to C4-alkoxylated C1- to C4-alkyl (meth)acrylates, monofunctional esters of (meth)acrylic acid and C1- to C4-alkoxylated phenols, C1- to C10-alkyl (meth)acrylates, C4- to C10-cycloaliphatic (meth)acrylates and C4- to C6 heterocyclic (meth)acrylates.

The most particularly preferred compounds B) comprises compounds selected from the group of phenoxy-ethylacrylate, phenole-(2,5-diethoxy) acrylat, 2-(2-ethoxyethyoxy) ethylacrylate, isobornyl acrylate and tetrahydrofurfuryl acrylate.

Typical photoinitiators C) comprising hydroxyphenyl ketones e.g. (1-hydroxycyclohexyl)phenyl ketone (e.g. Irgacure® 184, Ciba, Lampertheim, Del.), 1-hydroxydimethylphenyl ketone (e.g. Darocur® 1173, Ciba, Lampertheim, Del.), acylphosphinoxides, e.g. 2,4,6-trimethyl-benzoyl-diphenylphosphine oxide (e.g. Darocur® TPO, Ciba, Lampertheim, Del.), phenylbis-(2,4,6-trimethylbenzoyl) phosphione oxide (e.g. Irgacure® 819, Ciba, Lampertheim, Del.), phenylglyoxylates, e.g. phenylglyoxylic acid (methyl) ester (e.g. Irgacure® MBF, Ciba, Lampertheim, Del.) and benzyldimethylketales (e.g. Irgacure® 651, Ciba, Lampertheim, Del.).

Additives, binders and auxiliary substances D) known in coating and adhesive technology can be added to or combined with the bonder material. Such substances are flow and wetting additives, slip additives, fillers, nanoparticles, light-stabilising particles, anti-yellowing additives, thickeners, and additives for reducing the surface tension.

According to the invention, the UV curing bonder materials are formulated to such a ratio between components A) to B) that the viscosity at 25° C. is about 200 to 1000 mPas, preferably about 350 to 800 mPas and particularly preferred about 450 to 650 mPas.

The photoinitiator C) in the UV curing bonder composition according to the invention is contained in amounts of 1 to 10 wt.-%, preferably 2 to 8 wt.-%, particularly preferably 3 to 6 wt.-% based on all polymerizable compounds.

General Description of the Substrate Material

The polycarbonate resins are generally obtained by solution polymerization or melt polymerization of an aromatic dihydroxy compound and a carbonate precursor. Any aromatic dihydroxy compound is acceptable if discs made out of the respective polycarbonate satisfy the requirements of the high rotation speed test wherein said test is described in the experimental part of the specification and/or the respective polycarbonate satisfies the above relative solution viscosity ranges Preferred aromatic dihydroxy compounds are compounds of formula (1)

in which Z denotes a radical of the formula (2)

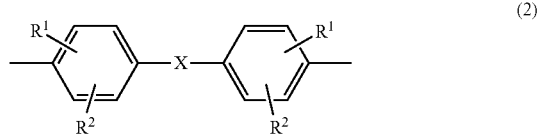

in which $R^1$ and $R^2$ independently of each other represent H or $C_1$-$C_8$-alkyl, preferably H or $C_1$-$C_4$-alkyl, in particular hydrogen or methyl and X represents a single bond, $C_1$-$C_6$-alkylene, $C_2$-$C_5$-alkylidene or $C_5$-$C_6$-cycloalkylidene, which may be substituted by $C_1$-$C_6$-alkyl, preferably methyl or ethyl, with the proviso that $R^1$ and $R^2$ represent hydrogen if X represents 3,3,5-trimethylcyclohexylidene.

Most preferably X represents isopropylidene and $R^1$ and $R^2$ represents hydrogen.

Aromatic dihydroxy compounds are generally known or can be prepared according to generally known methods. The interfacial or melt polymerization of polycarbonate is also generally known and described in numerous publications e.g. WO 2004/063249 A1, WO 2001/05866 A1, WO 2000/105867, U.S. Pat. No. 5,340,905, U.S. Pat. No. 5,097,002, U.S. Pat. No. 5,717,057.

The polycarbonate resin may be a homopolycarbonate obtained by homopolymerizing the above aromatic dihydroxy compound or a copolycarbonate obtained by copolymerizing two or more aromatic dihydroxy compounds mentioned above. The polycarbonate based on bisphenol A as diphenol monomer may contain up to 20 wt.-%, preferably up to 10 wt.-%, more preferably up to 5 wt.-%, based on the amount of diphenols used for the production of polycarbonate, additional diphenol monomers selected from the group consisting of 1,1-bis(4-hydroxyphenyl)-3,3,5-trimethylcyclohexan, α,α'-bis(4-hydroxyphenyl)m-diisopropylbenzen or 4,4'-dihydroxy-biphenyl or 2-Phenyl-3,3-bis(4'-hydroxyphenyl)phthalimide.

The reaction by the solution method is usually a reaction between the aromatic dihydroxy compound and phosgene, and is usually carried out in the presence of an acid coupling agent and an organic solvent. As the acid coupling agent, alkali metal hydroxides, such as sodium hydroxide or potassium hydroxide, or amine compounds, such as pyridine, are used. As the organic solvent, halogenated hydrocarbons, such as methylene chloride or chlorobenzene or mixtures of such hydrocarbons, are used. For accelerating the reaction, a catalyst such as tertiary amines, quaternary ammonium compounds or quaternary phosphonium compounds which are exemplified by triethylamine, N-ethyl-piperidine, tetra-n-butylammonium bromide, or tetra-n-butylphosphonium bromide respectively may also be used. Preferably, the reaction temperature is routinely 0 to 40° C., with a reaction time being 10 seconds to 5 hours and with a pH during the reaction being not less than 9. The reaction can be a batch process or a continuous process.

In the polymerization reaction, terminal capping agents for adjusting the relative solution viscosity are usually also employed. These terminal capping agents used may be monofunctional phenols. The polycarbonate resin obtained has its terminal capped by a monofunctional phenol based group so that it is superior in thermal stability to polycarbonate resin not obtained as described above. The monofunctional phenols are generally phenols or lower alkyl substituted phenols like phenol, p-tert-butylphenol, p-cumylphenol, isooctylphenol or long-chain alkyl phenols like decyl phenol, dodecyl phenol, hexadecyl phenol, octadecyl phenol, eicosyl phenol, docosyl phenol and triacontyl phenol. Preferred terminal capping agents are phenol, p-tert-butylphenol, p-cumylphenol and 3-n-pentadecylphenol (CAS #501-24-6).

The terminal capping agent is introduced in an amount to achieve the appropriate relative solution viscosity. The terminal capping agent may be used alone or in combination with other above mentioned phenol compounds.

The reaction by the melting method is usually an ester exchange reaction between an aromatic dihydroxy compound mentioned above and a carbonate ester, and is carried out by a method consisting in mixing the aromatic dihydroxy compound and the carbonate ester in the presence of an inert gas under heating and in distilling off the generated alcohol or phenol. Although the reaction temperature differs with e.g., the boiling point of the generated alcohol or phenol, it is usually 120 to 350° C. During the latter half of the reaction, the reaction system is reduced in pressure to approximately $1.33 \times 10^3$ to 13.3 Pa to facilitate distillation of the generated alcohol or phenol. The reaction time is usually 1 to 6 hours.

Among the carbonate esters, there are esters, such as C6 to C10 aryl groups or aralkyl groups or C1-4 alkyl groups, that may occasionally be substituted, specifically, diphenyl carbonate, bis(chlorophenyl) carbonate, dinaphtyl carbonate, bis(diphenyl) carbonate, dimethyl carbonate, diethyl carbonate and dibutyl carbonate. Of these, diphenyl carbonate is most preferred.

For accelerating the polymerization, polymerization catalysts may also be used. As these polymerization catalysts, those catalysts routinely used for esterification or ester exchange reactions, such as alkali metal compounds, e.g., sodium hydroxide, potassium hydroxide, or sodium or potassium salts of dihydric phenols, alkali earth metal compounds, such as calcium hydroxyide, barium hydroxide or magnesium hydroxide, nitrogen-containing basic compounds, such as tetramethyl ammonium hydroxide, tetraethyl ammonium hydroxide, trimethylamine or triethylamine, alkoxides of alkali metals or alkali earth metals, phosphorous-containing basic compounds like tetraphenylphosphoniumphenolat or organic acid salts of alkali metals or alkali earth metals, zinc compounds, boron compounds, aluminum compounds, silicon compounds, germanium compounds, organotin compounds, lead compounds, osmium compounds, antimony compounds, manganese compounds, titanium compounds or zirconium compounds, may be used. These catalysts may be used alone or in combination. These catalysts are used in an amount preferably of $1 \times 10^{-8}$ to $1 \times 10^{-3}$ equivalent, more preferably $1 \times 10^{-7}$ to $5 \times 10^{-4}$ equivalent, to one mol of the dihydric phenol as the starting material.

The aromatic polycarbonate resins may contain tri- or higher functional aromatic compounds or contain branched components in the polymer as a result of the isomerization reaction in polymerization. Examples of the tri- or higher functional aromatic compounds preferably include phlorogrucin, phlorogrucide, tris phenols, such as 4,6-dimethyl-2,4,6-tris(4-hydroxyphenyl) heptene-2,2,4,6-trimethyl-2,4,6-tris(4-hydroxyphenyl) heptane, 1,3,5-tris(4-hydroxyphenyl) benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methyl phenol, and 4-(4-[1,1-bis(4-hydroxyphenyl)ethyl]benzene)-α,α-dimethylnbenzyl phenol, tetra(4-hydroxyphenyl)methane, bis(2,4-dihydroxyphenyl) ketone, 1,4-bis(4,4-dihydroxytriphenyl methyl) benzene, trimellitic acid, pyromellitic acid, benzophenone tetracarboxylic acid and acid chlorites thereof. In case tri- or higher functional aromatic compounds are used, 1,1,1-tris(4-hydroxyphenyl)ethane and 1,1,1-tris(3,5-dimethyl-4-hydroxyphenyl)ethane, are preferred.

The polycarbonate or the copolycarbonate are characterized by the relative solution viscosity, determined in a polymer solution in dichloromethane, measured with an Ubbelhode capillary viscosimeter, capillary type 0 C. The polymer concentration is 5 g/l, the measurement is done at a temperature of 25° C. The preferred relative solution viscosity should be in the range of 1.190 to 1.230.

As release agent higher fatty acid ester of a monohydric alcohol or polyhydric alcohol may be added to the thermoplastic resin of the present invention. By blending a higher fatty acid ester of a monohydric or polyhydric alcohol, releasability from a mold at the time of molding the thermoplastic resin is improved, and a release load in the molding of a disk substrate becomes small, thereby making it possible to prevent the deformation of the disk substrate and pit dislocation caused by a release failure. The melt fluidity of the thermoplastic resin is also improved.

The positive amount of release agents is preferably less than 2000 ppm by weight of the resin, more preferably less than 1000 ppm by weight of the resin, especially preferred less than 500 ppm.

Preferred higher fatty acid esters are glycerol monostrearate and glycerol monopalmitate as well as mixtures of them.

Phosphorus-based thermal stabilizers, may be added to the thermoplastic resin also. Suitable phosphorus-based thermal stabilizers are for example, phosphorous acid, phosphoric acid, phosphonous acid, phosphonic acid and esters thereof. Specifically, phosphite compounds, such as triphenyl phosphite, tris nonylphenyl phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis (4,6-di-tert-butylphenyl) octyl phosphite, bis(nonylphenyl) pentaerythritol diphosphite and bis(2,4-di-tert-butylphenyl) pentaerythritol diphosphite, and phosphate compounds, such as tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxy ethyl phosphate, dibutyl phosphate and diisopropyl phosphate, may be indicated. Additional phosphorus-based thermal stabilizers are for example tetrakis(2,4-di-tert-butylphenyl)-4,4'-biphenylene diphosphonite, tetrakis(2,4-di-tert-butylphenyl)-3,3'-biphenylene diphosphonite and bis(2,4-di-tert-butylphenyl)-4-biphenylene phosphonite. Of these, tris nonylphenylphosphonite, distearyl pentaerythritol diphosphite, bis(2,4-di-tert-butylphenyl)pentaerythritol disphosphite, tris(2,4-di-tert-butylphenyl) phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite, are preferred. These thermal stabilizers may be used alone or as a mixture.

The amount of these thermal stabilizers, if added, is preferably 0.0001 to 0.05 weight part, more preferably 0.0005 to 0.02 weight part and most preferably 0.001 to 0.01 weight part to 100 parts by weight of the thermoplastic resin composition.

A generally known antioxidant may be added to the thermoplastic resin of the present invention to prevent oxidation. An example of the antioxidant is a phenol-based antioxidant. The amount of the antioxidant is preferably 0.0001 to 0.05 wt.-% based on the thermoplastic resin Above mentioned additives as well as other additives like optical stabilizers, colorants, antistatic agents and lubricants may be added to the resin for an optical disk substrate of the present invention in such limits that discs made out of the respective polycarbonate resin composition satisfy the requirements of the high rotation speed test.

Blends of polycarbonate with other thermopolastic resin may also be used as long as the discs made out of the respective blend satisfies the requirements of the high rotation speed test. Other thermoplastic resin may be selected from the group consisting of acrylic resin, preferably poly-methylmethacrylate, polystyrene resins as homopolymer or as co- or blockpolymer with other monomers selected from the group comprising isoprene and butadiene or mixtures thereof, or polycycloolefinic resins preferably polymerization products of olefins, such as moieties with a norbornene structure.

In the preparation of the resin composition of the present invention, it is conceivable that mixing of polycarbonate resins and/or mixing of a polycarbonate resin and other resin is carried out in solution or in the melt. As for means of mixing, in the stage of a polymer solution, a vessel equipped with a stirrer is mainly used, and for the second case equipment like a tumbler, twin-cylinder mixer, Nauter mixer, Banbury mixer, kneading roll or extruder may be used. In either case, any technique may be used and not particularly limited.

Process for the Production of the DVD Substrate

To produce a substrate from the above resin for an optical recording medium, an injection molding machine (including an injection compression molding machine) equipped with a stamper having pits and grooves which satisfy specifications required for an optical recording medium and a surface accuracy is used to form an optical disk substrate by injection molding. The thickness of the disk substrate generally is 0.55 to 0.60 mm. This injection molding machine may be a generally used machine but preferably a machine made from a material whose cylinder and screws have low adhesion to resins, corrosion resistance and abrasion resistance in order to suppress the production of carbide and improve the reliability of a disk substrate. The environment of the molding step is preferably as clean as possible in view of the object of the present invention. It is also important that the material to be molded should be fully dried to remove water and that residence which might cause the decomposition of a molten resin should be avoided.

In the following a production of a standard disc substrate of the optical recording medium of the present invention is described, said method was used in the experimental part and is not limiting to the scope of the invention. A disc substrate with a diameter of 120 mm and a thickness of 0.60 mm is injection molded from polycarbonate using an injection molding machine equipped with a mold and a stamper.

Process for the Production of the Dye and the Reflective Layer

DVD recordable discs use an organic dye as recording layer by means of spin coating process. For this process a fresh dye solution is prepared by solubilizing the dye powder in organic sol-vents. After the molding process, all substrates are transferred into temperature controlled conveyer to get efficient cooling of both sides of the substrate, ready for further dye coating process. The inline dye coating units are usually equipped with several automated dye dosing stations for the application of the precise controlled dye layer onto each grooved substrate. The spin coating process shall be strictly under a climate controlled environment. To remove residual solvent from the condensed dye film, the dye coated substrates are fed into the drying oven with infrared lamps.

For the deposition of a highly reflective metal layer on the top of the dye coated substrates, the high rate sputter module is used after drying process. The most common material is silver, or a silver alloy. A powerful and optimized metallizer can offer uniform sputtering throughout the target lifetime. Removement of residual dye on the edge of the dye coated and metallized layer 0 substrates by dosing the edge clean solvent after metallizing.

Description of the Bonding Process
Inline Process

The metallized and edge-cleaned layer 0 substrate was transferred to the bonding unit, where the bonder material is dosed at a disc by spin coating bonding process. Afterwards another blank layer 1 substrate was placed on top. The bonder was distributed between the two substrates with optimized spin process. The dosage of the bonder is chosen so that the bonder layer thickness achieved by this procedure is between 30 and 60 µm, preferably between 40 and 50 µm.

The discs are exposed to ultraviolet radiation to cure the bonding material by means of a radical polymerization reaction.

EXPERIMENTAL

Testing Procedures

Viscosity of the Bonder

The bonder formulation was prepared in a speed mixer (Hauschild DAC 150 FVZ). The viscosity was measured at 25° C. in an Oscillation Rheometer (Firma Anton Paar Physica Modell MCR 301) equipped with an oven CTD 450 which was set to 25° C. A cone-plate geometry was used. The diameter of the cone was 50 mm and the cone angle was 1°. The viscosity was measured in rotation mode at fixed shear rate of 10 l/s.

Measurement of the Youngs Modulus E and the Quality Factor Q

To determine the Young's modulus E and the damping related factor Q (quality factor) of the materials in the frequency range from about 10 Hz to 10 KHz, a set up that is analogue to what is described in ASTM E 756-05 (FIG. 1) is used. This measurement principle is based on the evaluation of the resonance frequencies $f_n$ of an oscillating beam of the material of interest. To excit the resonance frequencies the beam is clamped on one side to a Piezo-shaker, which is driven by an analog white noise signal with a range stretching from 1 mHz to 10 KHz. The beam response to that excitation e.g. the velocity versus frequency measured with a Laser-Doppler-Vibrometer (LDV) at the tip of the beam that is not clamped to the Piezo-shaker normalized to e.g. the velocity versus frequency of the excitation at the end of the beam that is clamped to the Piezo-shaker is recorded. Form this response curve E and Q are calculated as follows:

$$E = \frac{12\rho l^4 f_n^2}{H^2 C_n^2} \qquad (3)$$

$$Q = \frac{2f_n}{\Delta f_n} \qquad (4)$$

with:
E=Young's modulus of beam material in Pa,
$f_n$=the resonance frequency for mode n in Hz,
$\Delta f_n$=the half-power at full bandwidth (FWHM) of mode n in Hz,
$C_n$=coefficient for mode n of a clamped-free (uniform) beam,
H=thickness of beam in oscillation direction in meter,
l=length of beam in meter,
n=mode number: 1, 2, 3, . . . ,
Q=Quality factor of the beam material, dimensionless,
$\rho$=mass density of the beam in kg/m³.

The beam was cut out of a disc, that was fabricated according to the procedures described above or can be injection molded. The width W of the beam is choosen to be 0.013 m and the length l is chosen, so that the resonance frequencies fit well to the measured frequency range of 10 Hz to 10 kHz. The values of E and Q at 2000 Hz are calculated via linear interpolation using the respective values extracted from formula (3) and formula (4) at the measured $f_n$ below 2000 Hz and the measured $f_{n+1}$ above 2000 Hz.

Mass Density

The mass density ρ was measured with the Mettler density kit Mettler AT 250 H66765 at room temperature using ethanol as the immersing liquid, on samples cut out of the disks. Or alternatively a rectangular piece of the disc of known width W, known height H and know length l was cut out of the disc. The mass m of the rectangular piece of the disc was determined by weighing with a balance (e.g. Mettler AT 250) and ρ was calculated via ρ=m/(l·H·W).

Measurement of the Radial and Tangential Deviation

The radial deviation measures the angular deviation of the disc surface from a reference plane. It is defined as the angle measured in radial direction, between incident light perpendicular to the reference plane and the reflected light. The radial deviation of the disc was measured using an offline optical disk scanner from Basler (Modell: Basler Reference 100). The maximum nominal value measured on the disc is taken.

TE and FE Signal Evaluation of DVD+R(SL) Discs

A DVD writer (Plextor®-PX755A 1.01) was used to evaluate the TE/FE performance. Evaluation was done with the PlexTools Professional V2.32a software that comes with that writer. Another DVD writer (BenQ® 1650 BCIB) was used to evaluate the TE/FE performance. Evaluation was done with the QScan software that comes with that writer. The measurement has to be done on unrecorded discs at 16× speed. The maximum measured values of TE and FE were taken for each scan of a disc.

TE/FE test is a write test for blank DVD recordable discs (in simulation mode), measure the mechanical characteristics of the disc. FE (Focus Errors) indicates how well the pickup can focus the laser beam on the disc surface. TE (Tracking Errors) indicates how well the pickup can follow the spiral track of the disc. If the numbers are too high, there is a chance that a write error will happen. In this case the recording should be performed at a lower speed. This test will be performed at the highest recording speed in simulation mode. At the end of the test, the test result will indicate if this disc can be written at the highest speed with the good quality.

Description of the Binder A)

Binder AA) is the urethane acrylate Desmolux® XP2513 from Bayer MaterialScience AG, Leverkusen, Del.

Binder AH) is Ebecryl® 600 from Cytec Surface Specialities SA/NV; Ebecryl® 600 is a standard bisphenol A epoxy acrylate.

Further binders have been synthesized as depicted below. For these syntheses all percentages are by weight unless indicated otherwise.

The determination of the NCO content in % was undertaken by back titration with 0.1 mol/l hydrochloric acid following reaction with butylamine, on the basis of DIN EN ISO 11909.

The viscosity measurements of the binder were carried out with a plate-plate rotational viscosimeter RotoVisko 1 from Haake, Del. in accordance with ISO/DIS 3219:1990. The ambient temperature of 23° C., prevailing at the time when the experiments were conducted is referred to as RT.

Preparation of the Urethane Acrylate Binder AD

A 2000-ml four-necked glass flask with reflux condenser, heatable oil bath, mechanical stirrer, air traversal (2 l/h), internal thermometer and dropping funnel was charged with 275.1 g of bis-(4-isocyanatocyclohexene) methane (Desmodur® W, Bayer Material Science AG, Leverkusen, Del.). 0.50 g of dibutyltin dilaurate (Desmorapid® Z, Bayer Material-Science AG, Leverkusen, Del.) and 1.01 g 2,6-di-tert.-buyl-methyl phenole were added and the mixture was heated to 60° C. Subsequently, 722.4 g of Tone M100® (Dow, Schwalbach, Del.) were added drop wise at a rate such that the temperature did not exceed 70° C. Stirring was continued until the NCO-content dropped below 0.1%. This gave a colorless resin with a NCO-content of 0.08% and a viscosity of 15400 mPas (23° C.).

Preparation of the Urethane Acrylate Binder AE

A 2000-ml four-necked glass flask with reflux condenser, heatable oil bath, mechanical stirrer, air traversal (2 l/h), internal thermometer and dropping funnel was charged with 366.7 g of a HDI biuret (Desmodur® N3200, Bayer Material Science AG, Leverkusen, Del.). 0.49 g of dibutyltin dilaurate (Desmorapid® Z, Bayer MaterialScience AG, Leverkusen, Del.) and 1.01 g 2,6-di-tert.-buylmethyl phenole were added and the mixture was heated to 60° C. Subsequently, 653.6 g of Tone M100® (Dow, Schwalbach, Del.) were added dropwise at a rate such that the temperature did not exceed 70° C. Stirring was continued until the NCO-content dropped below 0.15%. This gave a colorless resin with a NCO-content of 0.12% and a viscosity of 38500 mPas (23° C.).

Preparation of the Urethane Acrylate Binder AF

A 2000-ml four-necked glass flask with reflux condenser, heatable oil bath, mechanical stirrer, air traversal (2 l/h), internal thermometer and dropping funnel was charged with 366.7 g of a HDI uretdione (Desmodur® N3400, Bayer Material Science AG, Leverkusen, Del.). 0.50 g of dibutyltin dilaurate (Desmorapid® Z, Bayer MaterialScience AG, Leverkusen, Del.) and 1.0 g 2,6-di-tert.-buylmethyl phenole were added and the mixture was heated to 60° C. Subsequently, 639.84 g of Tone M100® (Dow, Schwalbach, Del.) were added dropwise at a rate such that the temperature did not exceed 70° C. Stirring was continued until the NCO-content dropped below 0.1%. This gave a colorless resin with a NCO-content of 0.08% and a viscosity of 9050 mPas (23° C.).

Preparation of the Urethane Acrylate Binder AG

A 2000-ml four-necked glass flask with reflux condenser, heatable oil bath, mechanical stirrer, air traversal (2 l/h), internal thermometer and dropping funnel was charged with 153.22 g of hexamethylene diisocyanate (Desmodur® H, Bayer Material Science AG, Leverkusen, Del.). 0.50 g of dibutyltin dilaurate (Desmorapid® Z, Bayer MaterialScience AG, Leverkusen, Del.) and 1.0 g 2,6-di-tert.-buylmethyl phenole were added and the mixture was heated to 60° C. Subsequently, 532.95 g of Oxyester T1136® (Degussa AG, Marl, Del.) and then 313.73 g of Tone M100® (Dow, Schwalbach, Del.) were added dropwise at a rate such that the temperature did not exceed 70° C. Stirring was continued until the NCO-content dropped below 0.1%. This gave a colorless resin with a NCO-content of 0% and a viscosity of more than 500000 mPas (23° C.).

Reactive Thinner B)

Reactive thinner BA is dipropylene glycol diacrylate (comparative).

Reactive thinner BB is Laromer® POEA, BASF SE, Ludwigshafen, Del. (phenoxyethylacrylate).

Reactive thinner BC is OTA480®, Cyclec Surface Specialities, SA/NV (propoxylated glycerol triacrylate (comparative).

Reactive thinner BD is Photomer® 4039, Cognis, Deutschland GmbH (phenol-(2,5)ethoxylate acrylate).

Reactive thinner BE is Photomer® 4050, Cognis, Deutschland GmbH (polyethylene glycol 200 diacrylate) (comparative).

Reactive thinner BF is Sartomer® SR-833 S, Sartomer div. of Cray Valley, F (tricyclodecanedimethanol diacrylate) (comparative).

Reactive thinner BG is hexanediol diacrylate (comparative)

Reactive thinner BH is Sartomer® SR 256, Sartomer div. of Cray Valley, F (2-(2-ethoxyethoxy)ethyl acrylate).

Reactive thinner BI is Laromer® TBCH BASF SE, Ludwigshafen, Del., (4-t-butylcyclohexyl acrylate).
Photoinitiator C)

Photoinitiator CA is Darocur® 1173, Ciba Lampertheim, Del. (1-phenyl-2-hydroxy-2-methyl-1-propane-1-one).
Preparation of the Bonder Formulation All bonder materials depicted in Table 3 are formulated to such a ratio between binder A) and reactive thinner B) that the viscosity at 25° C. was about 480 to 520 mPas. Mixing of the bonder components was done according to procedures know to persons skilled in this art.
Description of the Substrate Molding Process Disk substrates (information substrate and dummy substrate) having a diameter of 120 mm and a thickness of 0.60 mm are injection molded from Makrolon® OD2015 from Bayer Material-Science AG using a Singulus E Mould DVD-R injection molding machines attached to a Singulus Streamline II DVD-R, equipped with ST-moulds from Axxicon moulds and a DVD+R or DVD-R stamper was used. Following molding parameters were used, see Table 2:

TABLE 2

Molding parameters according to disc molding process

| $T_{Cyl}$ (° C.) | $T_{Mold}$ (° C.) | Clamp Force (to) | Holding Time (s) | Cooling Time (s) | Injection Speed (cm³/s) |
|---|---|---|---|---|---|
| 360 | 123 | 32 | 0.5 | 2.3 | 220 |

$T_{cyl}$ is the melt temperature and $T_{Mold}$ is the mold temperature, whereas the left value respresents the mirror side of the mold and the right value the stamper side of the mold.

Description of the Production of the Dye and the Reflective Layer

DVD Recordable discs use an organic dye as recording layer by means of spin coating process. A fresh dye solution has been prepared by solubilizing the dye powder in tetrafluorpropanol as organic solvent. After the molding process, all substrates are transferred to temperate controlled conveyer to get efficient cooling of both sides of the substrate, ready for further dye coating process. The inline dye coating units are equipped with several automated dye dosing stations for the application of the precise controlled dye layer onto each grooved substrate. The spin coating process shall be strictly under a climate controlled environment. To remove residual solvent from the condensed dye film, the dye coated substrates are fed into the drying oven with infrared lamps.

For the deposition of a highly reflective metal layer on the top of the dye coated substrates, the high rate sputter module is used after drying process. The most common material is silver, or a silver alloy. A powerful and optimized metallizer can offer uniform sputtering throughout the target lifetime. Remove residual dye on the edge of the dye coated and metallized layer 0 substrates by dosing the diacetonacicohol solvent after metallizing.

In this case the downstream process equipment of the above mentioned Singulus Streamline II DVD-R machine was used.

Description of the DVD+R(SL) Inline Bonding Process

Single layer DVD+R discs were produced with the above substrates and the bonder formulations mentioned in table 4 using a Singulus Streamline II DVD-R machine. The bonding process is described as follows:

The metallized and edge-cleaned layer 0 substrate was transferred to the bonding unit, where the bonder material is dosed at a disc by spin coating bonding process. The dosage amount was 0.7 g. Afterwards another blank layer 1 substrate was placed on top. The bonder was distributed between the two substrates with optimized spin process. The bonder layer thickness achieved by this procedure was about 45 µm. The bonder layer thickness was measured by Basler Scanner REF 100.

The discs are exposed to ultraviolet radiation in the UV-curing station, to cure the bonding material by means of a radical polymerization reaction. The basic power of the UV lamp was 1.0 kW; Max. power of the UV lamp was 3.0 KW; Exposure time was 1.0 sec.

Description of the Manual Bonding Process

600 µm polycarbonate disc/bonder/600 µm polycarbonate disc sandwiches were fabricated as described below:

A 600 µm thick polycarbonate disc substrate was put on the spin coater (Karl Suess Model RC 8) chuck. The bonder was applied with a pressurized dosage system (GLT Model ETD 2000XL) at a disc radius of 35 mm. The spin speed was 200 RPM, the dosage time was 1.75 s. The syringe needle diameter used in the dosage system was 1.35 mm. The dosage pressure was adjusted to roughly 1.8 bar, so that a full circle of bonder material was dispersed on the substrate. A second 600 µm thick substrate was placed on top of the first substrate coated with the bonder. The bonder was distributed between the two substrate be spinning the sandwich structure at 1500 RPM for 10 second.

Subsequent crosslinking of the bonder was carried out on a UV exposure apparatus. The sandwich structure of the two substrates and the bonder in between is placed on a conveyor belt, which is moved past the UV light source (Hg lamp, 80 W) at a speed of about 1 m/minute. A radiation dosage of about 5 J/cm² is applied to the sandwich structure to cure the bonder material and from the disc.

The bonder layer thickness achieved by this procedure was about 60 µm. The bonder layer thickness was measured by subtraction of the thicknesses of the two substrates from the total thickness of the bonded disc. All thicknesses were measured with a micrometer screw.

From these manually bonded discs and also from the produced DVD+R(SL) discs, samples were cut to examine the oscillation behaviour of the disc with a laser Doppler vibrometer. Especially at the stated test bar geometry modal oscillation occurs at 270 Hz. The damping related Q values at 270 Hz were extracted from the data for the samples under test. Q is $1/(3 \cdot \tan(\delta))$, whereas $\tan(\delta)$ is the mechanical damping. The results of these measurements are depicted in Table 3 below.

TABLE 3

Composition of the bonder materials and the Q values at 270 Hz of the respective DVD + R disc that were bonded manually.

| Example | Binder A | Weight fraction | Reactive thinner B | Weight fraction | Initiator C | Weight fraction | Q@270 Hz |
|---|---|---|---|---|---|---|---|
| 1 | AA | 0.563 | BB | 0.408 | CA | 0.029 | 84 |
| 2 | AA | 0.485 | BD | 0.486 | CA | 0.029 | 68 |
| 3 | AA | 0.679 | BH | 0.291 | CA | 0.030 | 94 |
| 6 | AD | 0.728 | BH | 0.243 | CA | 0.029 | 66 |
| 7 | AE | 0.631 | BH | 0.340 | CA | 0.029 | 99 |
| 8 | AF | 0.728 | BH | 0.243 | CA | 0.029 | 128 |
| 9 | AG | 0.558 | BH | 0.413 | CA | 0.029 | 127 |

| Comparative Example | Binder | Weight fraction | Reactive thinner | Weight fraction | Initiator | Weight fraction | Q@270 Hz |
|---|---|---|---|---|---|---|---|
| 1 | AA | 0.561 | BA | 0.410 | CA | 0.029 | 258 |
| 2 | AA | 0.291 | BC | 0.680 | CA | 0.029 | 266 |
| 3 | AA | 0.515 | BE | 0.456 | CA | 0.029 | 196 |
| 4 | AA | 0.243 | BF | 0.728 | CA | 0.029 | 290 |
| 5 | AA | 0.602 | BG | 0.369 | CA | 0.029 | 255 |
| 6 | | | DIC® 6830 | | | | 227 |
| 7 | | | Sony® SK 6500 | | | | 199 |
| 16 | AA | 0.483 | BH | 0.146 | CA | 0.029 | 163 |
|    | AH | 0.196 | BG | 0.146 | | | |

As can be seen from Table 3, the bonder materials according to the present invention improve the damping at 270 Hz of the disc at least by a factor of 1.53 compared to discs made with actual commercially available bonder materials like DIC® 6830 or Sony® SK 6500 (examples 6-7) and with bonders comprising diacrylates as reactive thinners (examples 1 to 5 and 16). Sony® SK 6500 is a special acrylate based spin coatable and UV-curable DVD bonder from Sony Chemical & Information Device Corporation Japan, not containing the inventive bonder. DIC® 6830 is a special acrylate based spin coatable and UV-curable DVD bonder from DIC Corporation Japan, not containing the inventive bonder material.

To proof the relation of the higher damping of the disc with improved tracking (TE) and focusing (FE) performance DVD+R(SL) disc were produced utilizing bonder materials from example 3 and comparative examples 6 and 7. Details how TE and FE were measured are described in section 9, subsection TE and FE signal evaluation. The results of these tests are summarized in Table 4 below.

As can be seen clearly from the results above the bonder material of the present invention significantly improves TE and FE signals of the final DVD discs.

The invention claimed is:

1. An optical storage device comprising discs made from polycarbonate comprising a UV curable bonder material consisting of
   A) an urethane acrylate oligomer as binder, which is the reaction product of
      i) one or more polyisocyanates and
      ii) one or more hydroxyfunctional lactone ester acrylates having a number average molecular weight of from 200 g/mol to 2000 g/mol and having the formula:

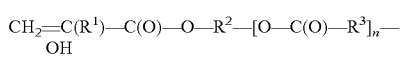

wherein, n is an integer from 1 to 5, $R^1$ is hydrogen or methyl, $R^2$ represents an alkylene group or substituted alkylene group having from 2 to 10 carbon atoms and $R^3$ represents a straight or branched chain alkylene

TABLE 4

TE/FE signals at 16X from DVD + R (SL)'s made with dedicated bonders

| Example | Bonder-material | Substrate polycarbonate | Max. radial deviation (°) | Max. tangential deviation (°) | TE | FE | Q@270 Hz |
|---|---|---|---|---|---|---|---|
| 10 Plextools | Example 3 | Makrolon® OD 2015 | 0.76 | 0.15 | 32 | 16 | 94 |
| 10 QScan | Example 3 | Makrolon® OD 2015 | 0.76 | 0.15 | 251 | 89 | 94 |
| Comparative Example | | | | | | | |
| 17 Plextools | DIC® 6830 | Makrolon® OD 2015 | 0.78 | 0.22 | 41 | 22 | 227 |
| 17 QScan | DIC® 6830 | Makrolon® OD 2015 | 0.78 | 0.22 | 291 | 109 | 227 |
| 18 Plextools | Sony® SK 6500 | Makrolon® OD 2015 | 0.51 | 0.08 | 48 | 20 | 199 | group of from 3 to 8 carbon atoms, and which may be substituted with one or more alkyl groups having from 1 to 12 carbon atoms, B) a reactive thinner, comprising monofunctional (meth)acrylates C) a photoinitiator and D) optional additives;

wherein the optical storage device is a DVD.

2. The optical storage device according to claim 1 wherein the polyisocyante component i) of the urethane acrylate A) is an oligomer of hexamethylenediisocynate and/or dicyclohexylmethanediisocyante.

3. The optical storage device according to claim 1 wherein the hydroxylcontaining component ii) of the urethane acrylate A) is the reaction product of hydroxyethylacrylate, hydroxypropylacrylate or hydroxybutlyacrylate with ε-caprolactone.

4. The optical storage device according to claim 1 wherein component B) is selected from the group comprising alkoxylated alkyl (meth)acrylates, monofunctional esters of (meth)acrylic acid and alkoxylated phenoles, alkyl (meth)acrylates, cycloaliphatic (meth)acrylates and heterocyclic (meth)acrylates.

5. The optical storage device according to claim 1 wherein component B) is selected from the group comprising C1- to C4-alkoxylated C1- to C4-alkyl (meth)acrylates, monofunctional esters of (meth)acrylic acid and C1- to C4-alkoxylated phenols, C1- to C10-alkyl (meth)acrylates, C4- to C10-cycloaliphatic (meth)acrylates and C4- to C6 heterocyclic (meth)acrylates.

6. The optical storage device according to claim 1 wherein component B) is selected from the group consisting of phenoxy-ethylacrylate, phenole-(2,5-diethoxy)acrylate, 2-(2-ethoxyethyoxy)ethylacrylate, isobornyl acrylate and tetrahydrofurfuryl acrylate.

7. Use of a UV-curable bonder material consisting of

A) an urethane acrylate oligomer as binder, which is the reaction product of i) one or more polyisocyanates and ii) one or more hydroxyfunctional lactone ester acrylates having a number average molecular weight of from 200 g/mol to 2000 g/mol and having the formula:

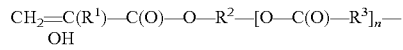

wherein, n is an integer from 1 to 5, $R^1$ is hydrogen or methyl, $R^2$ represents an alkylene group or substituted alkylene group having from 2 to 10 carbon atoms and $R^3$ represents a straight or branched chain alkylene group of from 3 to 8 carbon atoms, and which may be substituted with one or more alkyl groups having from 1 to 12 carbon atoms, B) a reactive thinner, comprising monofunctional acrylates C) a photoinitiator and D) optional additives, as bonder material for the production of DVDs.

8. Use of a UV-curable bonder material according to claim 7 for the production of DVDs, showing a Q value of less than 130 measured at 270 Hz.

9. Process for the production of DVDs comprising discs made from polycarbonate whereby in a step 1 on a first polycarbonate disc substrate, comprising optionally dye and reflective layers, a UV-curable bonder composition consisting of A) an urethane acrylate oligomer as binder, which is the reaction product of i) one or more polyisocyanates and ii) one or more hydroxyfunctional lactone ester acrylates having a number average molecular weight of from 200 g/mol to 2000 g/mol and having the formula:

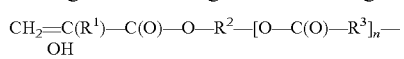

wherein, n is an integer from 1 to 5, $R^1$ is hydrogen or methyl, $R^2$ represents an alkylene group or substituted alkylene group having from 2 to 10 carbon atoms and $R^3$ represents a straight or branched chain alkylene group of from 3 to 8 carbon atoms, and which may be substituted with one or more alkyl groups having from 1 to 12 carbon atoms, B) a reactive thinner, comprising monofunctional acrylates C) a photoinitiator and D) optional additives, is applied and in step 2 a second polycarbonate disc substrate is placed on top of the coated substrate resulting from step 1 and in step 3 the resulting product from step 2 is cured by UV-radiation.

10. The optical storage device according to claim 1, wherein the optical storage device comprises at least two polycarbonate discs.

11. The optical storage device according to claim 1, wherein the optical storage device comprises two polycarbonate discs.

* * * * *